Feb. 5, 1952     A. J. WEATHERHEAD, JR     2,584,948
METHOD OF MAKING HOSE ENDS
Original Filed March 16, 1945
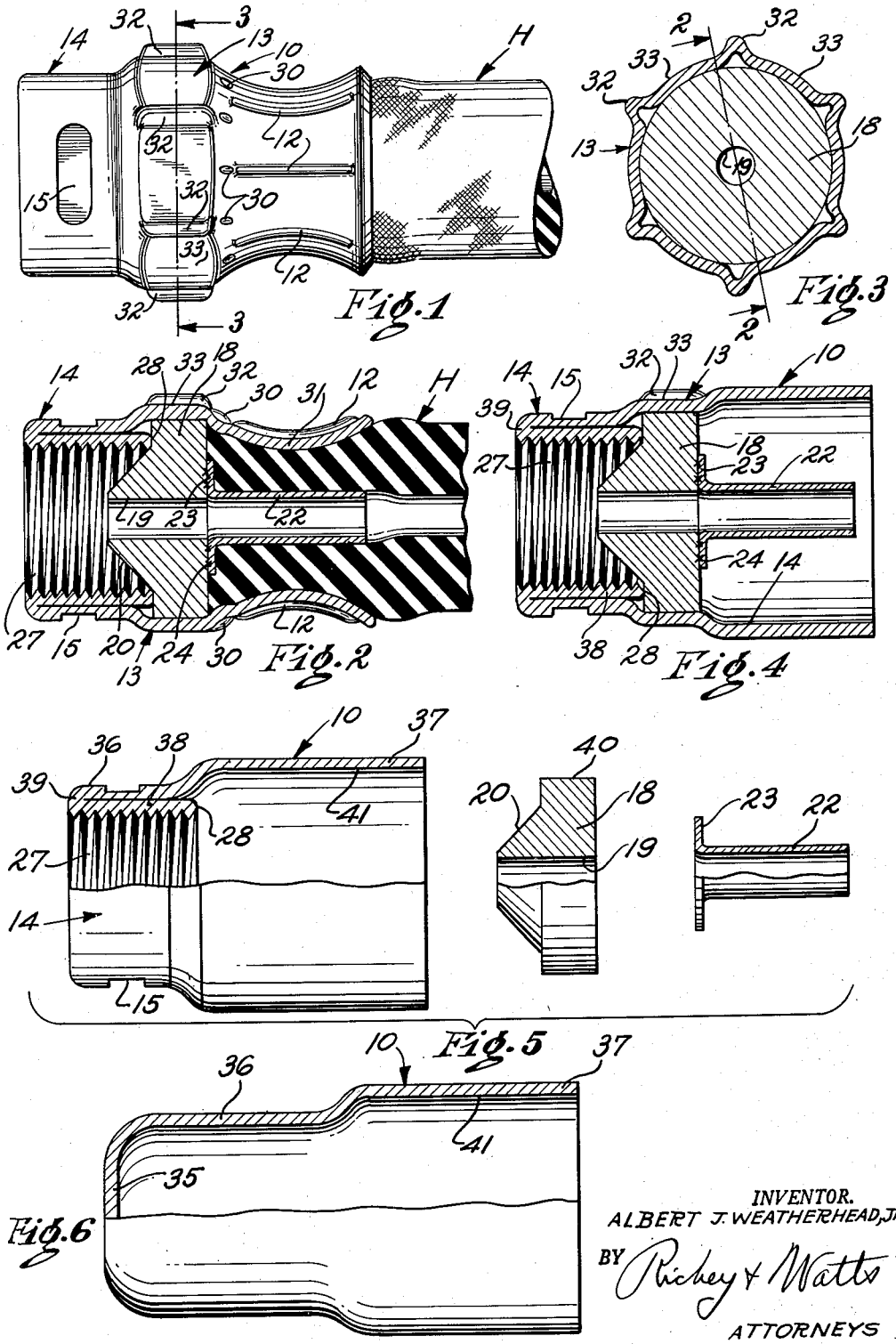
INVENTOR.
ALBERT J. WEATHERHEAD, JR.

Patented Feb. 5, 1952

2,584,948

UNITED STATES PATENT OFFICE 2,584,948

METHOD OF MAKING HOSE ENDS

Albert J. Weatherhead, Jr., Shaker Heights, Ohio, assignor to The Weatherhead Company, Cleveland, Ohio, a corporation of Ohio Original application March 16, 1945, Serial No. 583,119. Divided and this application March 19, 1947, Serial No. 735,765

1 Claim. (Cl. 29—157)

This invention relates to a new method of making couplings, and more particularly to a method of making couplings or fittings for connecting the ends of flexible hoses, such as hoses composed of rubber or rubber-like materials and reinforced with fabric or wire, to other fluid conduits such as tubes of copper, aluminum or steel. This invention is a division of my co-pending application Serial No. 583,119, filed March 16, 1945, entitled "Hose End," now Patent No. 2,432,598, dated December 16, 1947.

An object of this invention is the provision of a method of making couplings which, although they are sturdy and leak-proof, are made up of inexpensive stampings and automatic screw machine parts that can be assembled rapidly and economically by high production operations such as crimping and spot welding.

A further object is to provide a method of forming a coupling in which the machining operations are carried out on the several parts before they are assembled together, thus reducing the time and expense of the machining.

A further object is to provide a hose coupling which will require a minimum of machine work so that a minimum of waste in the form of chips due to machining operations is produced.

Another object is to provide a method of making a hose coupling in which the hose clamping sleeve is formed separately of a ductile metal which can be readily deformed into engagement with the hose, whereas another part of the coupling is formed separately and fastened in the sleeve by deforming the sleeve so that said parts, even though they are separately formed, may be assembled before the sleeve is crimped to the hose end.

Further objects and advantages of my invention will become apparent from the following description of a preferred from thereof, reference being made to the accompanying drawings in which:

Fig. 1 is an elevation of a completed assembly embodying a flexible hose to which a preferred form of coupling is secured;

Fig. 2 is a longitudinal section through the hose coupling of Fig. 1, the section being taken as indicated by line 2—2 of Fig. 3;

Fig. 3 is a transverse section taken along the line 3—3 of Fig. 1;

Fig. 4 is a longitudinal section through the coupling showing the coupling before it has been secured to the end of a hose;

Fig. 5 illustrates the several parts making up the coupling of Fig. 1, the parts being shown partly in section; and Fig. 6 is a view partially in section showing the coupling sleeve in one stage of the manufacturing operation after it has been pressed out from a flat sheet.

Briefly, my present invention relates to the method of making a coupling of the type in which the hose is secured within the coupling by a sleeve member which is deformed inwardly to compress the hose against an internal standpipe or nipple extending within the bore of the hose.

A completed assembly made in accordance with my novel method is shown in Figs. 1 to 3, and in Figs. 1 and 2, the fitting is shown as it appears after it has been secured to a flexible hose H. The fitting comprises an outer sleeve member indicated generally at 10 and having a hose engaging portion 31 which is deformed inwardly into engagement with the hose preferably by crimping, the crimping operation leaving ribs 12 on the exterior of this portion of the sleeve. The sleeve 10 also has an intermediate portion 13 that grips an insert member 18 and an internally threaded end portion 14 which functions to couple the hose to another fluid conduit, the threads being adapted to receive a conventional coupling nut (not shown) or other male coupling member. During the crimping of intermediate portion 13, the wall is stretched at circumferentially-spaced zones to resiliently grip the insert and simultaneously wrench-receiving ribs 32 are formed. In order to provide for mounting the coupling in an apertured plate, the portion 14 of the sleeve may be provided with oppositely disposed milled slots 15 as described in detail in my co-pending application Serial No. 583,119, filed March 16, 1945, now Patent No. 2,432,598, issued Dec. 16, 1947.

As shown particularly in Fig. 2, the interior of the body of the hose coupling preferably comprises the body unit 18 having a central bore 19 and terminating in a conical nose or seating surface 20 which extends into the internally threaded end 14 of the sleeve 10. The sleeve and the body together thus form the female part of a flared tube coupling of the inverted type. At the opposite side of the body insert 18 from the seating surface 20, the nipple or standpipe 22 is provided. This projects into the bore of the hose H and is preferably provided with a flange 23 welded to the radial surface of the body insert 18 as indicated diagrammatically at 24.

It is ordinary practice, in the manufacture of couplings of this general type, to machine the body sleeve, sealing wall, and standpipe from a single piece of bar stock. According to the present invention, I produce couplings of the same general type by forming the body sleeve part from a single stamping in the form of a drawn cup or tube formed from a piece of flat stock or from a punching from flat stock.

The drawn cup 10 shown in Fig. 6 has an end wall 35 and a tubular portion 36 merging with a tubular portion 37 of larger diameter. The next operation comprises a drawing and punching operation wherein by using a punch of the proper diameter the end wall 35 is simultaneously folded back on tubular portion 36 and the end wall is pierced, forming an inner reinforcing wall 38 as seen in Fig. 2. This provides a double thickness wall at one end of the sleeve 10 which can be threaded as at 27 without cutting through or seriously weakening the sleeve. Since wall portion 38 is in tight engagement with portion 36 and is joined thereto by a full thickness section at 39 the threaded portion is fully as strong as the sleeve proper and yet the entire member was originally of one thickness. This method of construction provides an additional advantage in that a shoulder 28 is provided to act as a stop or locating abutment for the body insert 18 during final assembly. Slots 15 may be milled in the sleeve at this time to receive fasteners in case the fitting is to be clamped to a frame member.

A body insert 18 is machined from bar stock and is formed with a bore 19 to conduct fluid, a tapered nose 20 to seal against a detachable coupling member or a flared tube, and a peripheral wall 40 of a diameter somewhat less than the diameter of the internal surface 41 of body sleeve 10. The insert may be formed on an automatic screw machine of free machining rod stock which produces such parts at very low cost.

The standpipe 22 is formed by stamping, such stampings being rapidly and economically formed by eyelet machines or the like. The standpipe includes a radial flange 23 which is brazed or spot welded to the insert 40 before final assembly of the fitting preferably by the use of jigs that make such operations rapid. The joint is made leak-proof for reasons to be hereinafter set out.

As shown in Fig. 5, wherein the several parts making up the fitting are illustrated as they appear just prior to assembly, it will be noted that all of the machining operations on the several parts have been completed before assembly. Thus, the slots 15 are milled in the end 14 of the sleeve, and the inwardly folded inner surface of the end 14 has been threaded as at 27. The threading operation in particular can be carried out much easier before assembly of the sleeve with the inner body member 18, for in the absence of the body member 18, the threading tap can be a conventional solid tap which can cut the threads all the way to the end 28 of the inwardly turned portion 38 of the sleeve. This simplifies the manufacture because in producing a conventional inverted female fitting of this sort, it is necessary to provide a hollow tap to receive the conical seat of the fitting.

The assembled insert and associated standpipe may be initially secured in the sleeve 10 by placing the insert against shoulder 28 and then deforming or crimping an intermediate portion 13 of sleeve 10 about the peripheral wall 40 of the insert so as to stretch circumferential zones of the wall to resiliently grip the insert's periphery, it being remembered that such wall is initially of smaller diameter than wall 41 of the sleeve. This operation may be carried out rapidly and economically on crimping machines.

Preferably this operation is carried out so as to provide a wrench-engaging surface on the coupling. This is accomplished by making at least the portion of the sleeve in the zone surrounding the insert initially of somewhat greater diameter than the outside diameter of the insert 18 as described, and then subjecting the sleeve to a crimping operation to give it the form shown particularly in Fig. 3. As there shown, the crimping operation is preferably carried out to provide six equally spaced projections 32 on the exterior of the intermediate portion 13 of the sleeve 10. These projections extend parallel to the axis of the coupling and project outwardly beyond the intermediate arcuate portions 33 of the sleeve to a sufficient extent that a straight line drawn between any two adjacent projections 32 will either clear the intermediate arcuate portion 33 or be just tangent thereto. This arrangement provides the coupling with what is in effect a generally hexagonal portion which can be readily manipulated by a conventional wrench.

The fitting, before the hose is secured therein, is illustrated in Fig. 4. It will be noted that the diameter of the sleeve 10 is reduced slightly in the region 13. This reduction in diameter is accomplished in the crimping operation just described and retains the parts in assembled relation so that they may be handled or transported as a unit before the hose itself is attached.

When it is desired to mount the coupling on a hose end H, the hose is inserted so that standpipe 22 enters its passageway and the end of the hose abuts the body insert. The sleeve portion 31 is then crimped to firmly compress and grip the hose, the crimping leaving ribs 12 in accordance with conventional practice. During the crimping operation the sleeve may also be staked as at 30 to provide additional mechanical means for retaining the insert 18 in place. It is not necessary that the joint between the insert and sleeve 10 be leak-proof, however, because conical nose 20 effects a seal with the associated detachable tube or coupling member at one end of the insert, and the hose is firmly clamped against the standpipe 22 at the other end by the crimping operation, it being remembered that the welded joint between flange 23 of the standpipe and the insert is leak-proof.

Thus, due to my novel method of manufacture the several parts making up the coupling are arranged so that they can be manufactured and assembled in quantities at relatively low cost. Furthermore, there is little waste of material in the manufacturing operations, for much of the machining ordinarily necessary in the manufacture of couplings is eliminated, and the parts are made of inexpensive flat stock and round bar stock. Furthermore, the separate formation of the body insert and the sleeve enables these parts to be made out of materials best suited for their particular functions. Thus the body insert can be machined from high sulphur free machining stock, while a ductile deep drawing stock may be used for the sleeve 10, such material being ideally suited for the subsequent operation of crimping to secure the hose within the coupling. The sleeve member has ample thickness for threading and slotting at one end, while the other end is of the proper thickness to be deformed into clamping engagement with the hose. Finally, even though the coupling is made up of preformed parts rather than from solid stock, these parts are retained together in assembled relation for handling and shipment before their final assembly with the hose.

Various changes and modifications within the scope and spirit of my invention will be apparent to those skilled in the art. It is, therefore, to be understood that the foregoing description is given by way of example only and that my patent is not limited thereto or in any manner other than by the scope of the appended claim, and the range of equivalents to which it is entitled.

What is claimed is:

The method of making a hose coupling member which includes the steps of forming from flat stock a generally cylindrical hollow stamping having a closed end and a cylindrical portion of reduced diameter adjacent said closed end, folding the wall of the stamping inwardly adjacent said closed end, and punching out said closed end to provide a cylindrical end portion having a double wall of lesser internal diameter than the remainder of the stamping, threading the interior of said end portion, machining a body insert out of round bar stock, said insert being of greater diameter than the internal diameter of said threaded end portion and of lesser diameter than the internal diameter of the stamping in the zone adjacent the threaded end portion and having a central bore therethrough, securing a standpipe to said insert, positioning said insert within said stamping abutting the end of the folded in portion with the standpipe projecting away from the threaded end portion, and deforming a portion of the stamping adjacent the insert into engagement therewith and simultaneously forming a non-circular wrench-engaging surface on said cylindrical portion.

ALBERT J. WEATHERHEAD, Jr.

REFERENCES CITED

The following references are of record in the file of this patent:

UNITED STATES PATENTS

| Number | Name | Date |
|---|---|---|
| 1,427,904 | Junkers | Sept. 5, 1922 |
| 1,699,541 | Murray | Jan. 22, 1929 |
| 1,735,563 | Deckard | Nov. 12, 1929 |
| 1,918,715 | Robinson | July 18, 1933 |
| 2,028,316 | Brunner | Jan. 21, 1936 |
| 2,211,147 | Miller | Aug. 13, 1940 |
| 2,310,536 | Melsom | Feb. 9, 1943 |
| 2,314,002 | Lusher | Mar. 16, 1943 |
| 2,432,598 | Weatherhead | Dec. 16, 1947 |